(12) United States Patent
Qian et al.

(10) Patent No.: US 10,608,712 B2
(45) Date of Patent: Mar. 31, 2020

(54) WIRELESS COMMUNICATION DEVICE AND WIRELESS COMMUNICATION METHOD FOR CHANNEL ESTIMATION

(71) Applicant: Sony Corporation, Tokyo (JP)

(72) Inventors: Chen Qian, Beijing (CN); Zhaocheng Wang, Beijing (CN); Jinhui Chen, Beijing (CN); Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 54 days.

(21) Appl. No.: 15/556,077

(22) PCT Filed: Mar. 21, 2016

(86) PCT No.: PCT/CN2016/076833
§ 371 (c)(1),
(2) Date: Sep. 6, 2017

(87) PCT Pub. No.: WO2016/150359
PCT Pub. Date: Sep. 29, 2016

(65) Prior Publication Data
US 2018/0062710 A1     Mar. 1, 2018

(30) Foreign Application Priority Data

Mar. 25, 2015   (CN) .......................... 2015 1 0133683

(51) Int. Cl.
*H04B 7/0452* (2017.01)
*H04B 7/04* (2017.01)
(Continued)

(52) U.S. Cl.
CPC ............. *H04B 7/0452* (2013.01); *H04B 7/04* (2013.01); *H04B 7/0456* (2013.01);
(Continued)

(58) Field of Classification Search
CPC ...... H04B 7/0452; H04B 7/0617; H04B 7/04; H04B 7/0456; H04L 5/0092;
(Continued)

(56) References Cited

U.S. PATENT DOCUMENTS

| 8,503,291 B1 * | 8/2013 | Lee ...................... H04B 7/0456 370/208 |
| 2009/0046800 A1 * | 2/2009 | Xu ....................... H04B 7/0617 375/267 |

(Continued)

FOREIGN PATENT DOCUMENTS

| CN | 101686110 A | 3/2010 |
| CN | 101932096 A | 12/2010 |

(Continued)

OTHER PUBLICATIONS

International Search Report dated Jun. 16, 2016 in PCT/CN2016/076833 filed Mar. 21, 2016.

*Primary Examiner* — Ian N Moore
*Assistant Examiner* — Justin T Van Roie
(74) *Attorney, Agent, or Firm* — Xsensus LLP

(57) ABSTRACT

A wireless communication includes at least one processor. The at least one processor is configured to generate user-specific reference signals used for assisting in downlink transmission; add identical or related reference signals into two or more data streams to be transmitted; and precode the two or more data streams into which the identical or related reference signals are added, so as to generate a downlink data signal.

18 Claims, 12 Drawing Sheets

(51) Int. Cl.
*H04L 5/00* (2006.01)
*H04B 7/06* (2006.01)
*H04B 7/0456* (2017.01)
*H04L 27/26* (2006.01)

(52) U.S. Cl.
CPC ......... *H04B 7/0617* (2013.01); *H04L 5/0005* (2013.01); *H04L 5/0023* (2013.01); *H04L 5/0051* (2013.01); *H04L 5/0092* (2013.01); *H04L 27/2613* (2013.01); *H04L 27/2671* (2013.01); *H04L 5/0007* (2013.01)

(58) Field of Classification Search
CPC ... H04L 5/0051; H04L 5/0023; H04L 5/0005; H04L 27/2671; H04L 27/2613; H04L 5/0007

See application file for complete search history.

(56) References Cited

U.S. PATENT DOCUMENTS

| | | | |
|---|---|---|---|
| 2010/0173640 | A1* | 7/2010 | Pajukoski ............ H04B 7/0434 455/450 |
| 2010/0246527 | A1* | 9/2010 | Montojo ................. H04L 5/005 370/330 |
| 2011/0176632 | A1 | 7/2011 | Jeong et al. |
| 2011/0256897 | A1* | 10/2011 | Taoka .................. H04B 7/0615 455/509 |
| 2012/0008591 | A1* | 1/2012 | Miki ....................... H04J 13/16 370/330 |
| 2012/0147773 | A1 | 6/2012 | Kim et al. |
| 2013/0215842 | A1 | 8/2013 | Han et al. |
| 2014/0050279 | A1 | 2/2014 | Kishiyama |
| 2016/0073383 | A1 | 3/2016 | Han et al. |

FOREIGN PATENT DOCUMENTS

| | | |
|---|---|---|
| CN | 103518339 A | 1/2014 |
| CN | 104205672 A | 12/2014 |
| WO | 2011/013986 A2 | 2/2011 |

* cited by examiner

WIRELESS COMMUNICATION DEVICE AND WIRELESS COMMUNICATION METHOD FOR CHANNEL ESTIMATION

FIELD

The present disclosure generally relates to the field of wireless communication, and more particularly to wireless communication device and method for base station side, and wireless communication device and method for user equipment side.

BACKGROUND

Massive multi-input multi-output (MIMO) system received extensive attention in recent years. Researches show that massive MIMO system can significantly improve the spectrum efficiency along with the energy efficiency of a system by using linear detection and precoding algorithm such as zero-forcing algorithm and least mean square error. Thus massive MIMO system is likely to be adopted by the next generation communication standard as a key technology.

Existing reference signals for channel estimation include various types of reference signals adopted in Long Term Evolution Advanced (LTE-A)/Long Term Evolution (LTE) technology, such as channel state information RS (CSI-RS) and cell-specific reference signal (CRS) for estimating a physical channel coefficient and user equipment-specific RS (UE-RS) for estimating an effective channel coefficient.

SUMMARY

According to the existing solution, the overhead caused by reference signals for channel estimation is directly proportional to the number of antennas at a base station. When the number of antennas and the number of users increase, for a massive MIMO system, for example, communication resources occupied by the reference signals increase accordingly, which will result in a decrease of overall capacity of the system.

In the following, an overview of the present disclosure is given to provide basic understanding to some aspects of the present disclosure. However, it should be understood that this overview is not an exhaustive overview of the present disclosure. It is not intended to determine a critical or important part of the present disclosure, or limit the scope of the present disclosure. The object of the overview is only to give some concepts in a simplified manner, which serves as a preface for a more detailed description provided later.

A wireless communication device for base station side according to an embodiment includes at least one processor. The processor is configured to: generate a user-specific reference signal for assisting a downlink transmission; add identical or correlated reference signals into two or more data streams to be transmitted; and precode the two or more data streams into which the identical or correlated reference signals are added, to generate a downlink data signal.

A wireless communication method performed by a base station according to another embodiment includes a step of generating a user-specific reference signal for assisting a downlink transmission. The method further includes a step of adding identical or correlated reference signals into two or more data streams to be transmitted. The method further includes a step of precoding the two or more data streams into which the identical or correlated reference signals are added, to generate a downlink data signal.

A wireless communication device for user equipment side according to another embodiment includes at least one processor. The processor is configured to: generate a user-specific reference signal for assisting an uplink transmission; add identical or correlated reference signals into two or more data streams to be transmitted; and precode the two or more data streams into which the identical or correlated reference signals are added, to generate an uplink data signal.

A wireless communication method performed by a user equipment according to another embodiment includes a step of generating a user-specific reference signal for assisting an uplink transmission. The method further includes a step of adding identical or correlated reference signals into two or more data streams to be transmitted. The method further includes a step of precoding the two or more data streams into which the identical or correlated reference signals are added, to generate an uplink data signal.

A wireless communication device for a transmitting end according to another embodiment includes at least one processor. The processor is configured to: generate a reference signal for a data demodulation; add identical or correlated reference signals into two or more data streams to be transmitted; and precode the two or more data streams into which the identical or correlated reference signals are added, to generate a data signal to be transmitted.

A wireless communication device for a receiving end according to another embodiment includes at least one processor. The processor is configured to: demodulate a data signal received from multiple antenna ports based on identical or correlated reference signals; and restore two or more data streams contained in the data signal based on a result of the demodulating, wherein the identical or correlated reference signals are added into the two or more data streams, respectively.

In the solutions according to the embodiments of the present disclosure, by using identical or correlated reference signals for multiple data streams, more users can be supported without increasing the length of reference signal, thereby the utilization rate of reference signal is improved.

BRIEF DESCRIPTION OF THE DRAWINGS

The present disclosure may be better understood with reference to the description given in conjunction with the drawings hereinafter. Same or similar components are represented by same or similar reference characters throughout the drawings. The drawings together with the detailed description below are incorporated in the specification and form a part of the specification, for further exemplifying preferred embodiments of the present disclosure and explaining the principle and advantages of the invention.

DETAILED DESCRIPTION OF THE EMBODIMENTS

Figure 1:
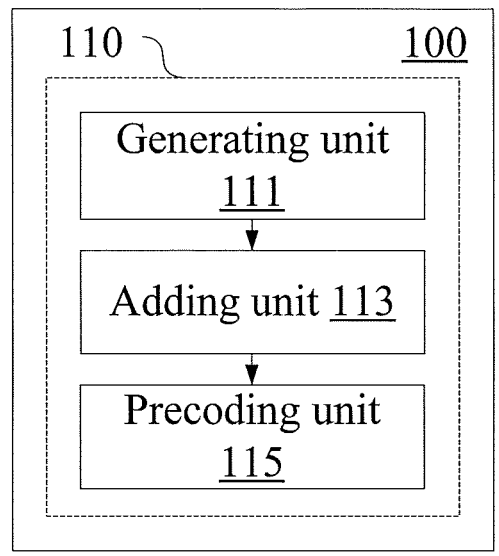
FIG. 1 is a block diagram showing a configuration example of a wireless communication device for base station side according to an embodiment of the present disclosure.

Hereinafter, embodiments of the present disclosure are described with reference to the drawings. Elements and features depicted in one of the drawings or one embodiment of the present disclosure may be combined with elements or features depicted in one or more other drawings or embodiments. It should be noted that, representation and description of components and processing which are known by those skilled in the art and are irrelevant to the present disclosure are omitted in the drawings and the specification for clarity.

As shown in FIG. 1, a wireless communication device 100 for base station side according to an embodiment of the present disclosure includes at least one processor 110. For example, the processor 110 includes a generating unit 111, an adding unit 113 and a precoding unit 115.

It should be noted that although each of the generating unit 111, the adding unit 113 and the precoding unit 115 in the processor 110 is shown as a functional module in the FIG. 1, the functions of the generating unit 111, the adding unit 113 and the precoding unit 115 may also be implemented by the processor 110 as a whole, and are not necessarily implemented by discrete components in the processor 110. In addition, although the processor 110 is shown as one dashed-line box in FIG. 1, the wireless communication device 100 may include multiple processors, and the functions of the generating unit 111, the adding unit 113 and the precoding unit 115 may be distributed into multiple processors, and the multiple processors operate cooperatively to execute the functions.

The generating unit 111 is configured to generate a user-specific reference signal (UE-specific RS) for assisting downlink transmission.

According to an embodiment, the reference signal may be used to estimate an effective channel coefficient. More specifically, the reference signal includes, for example, a demodulation reference signal (DMRS). An exemplary manner of generating the reference signal will be illustrated below in conjunction with an specific embodiment. However, the reference signal according to the embodiment of the present disclosure is not necessarily used for data demodulation.

The adding unit 113 is configured to add identical or correlated reference signals into two or more data streams to be transmitted. For example, the DMRS may be carried in a predetermined position of a resource block of a physical downlink shared channel (PDSCH), and data is carried in the other positions.

The "identical or correlated reference signals" herein may be understood as "non-orthogonal reference signals", and the "identical or correlated reference signals" are further illustrated below.

The identical reference signals may be generated based on identical sequences and occupy identical time-frequency resources. The correlated reference signals may be generated based on correlated sequences and occupy time-frequency resources which at least partially overlap with each other. In addition, the correlated reference signals may also be generated based on identical sequences and occupy time-frequency resources which partially overlap with each other.

The correlation of sequences refers to, based on a sequence set of existing orthogonal covering codes (OCC) available to one cell, adding non-orthogonal OCCs to spread the available OCCs, reference signals obtained by such OCC frequency spreading are correlated with each other, but not necessarily orthogonal to each other, which has an advantage of increasing the number of available sequences.

Next, the identical or correlated reference signals are illustrated with reference to examples in FIG. 16 to FIG. 20.

Figures 16, 17:
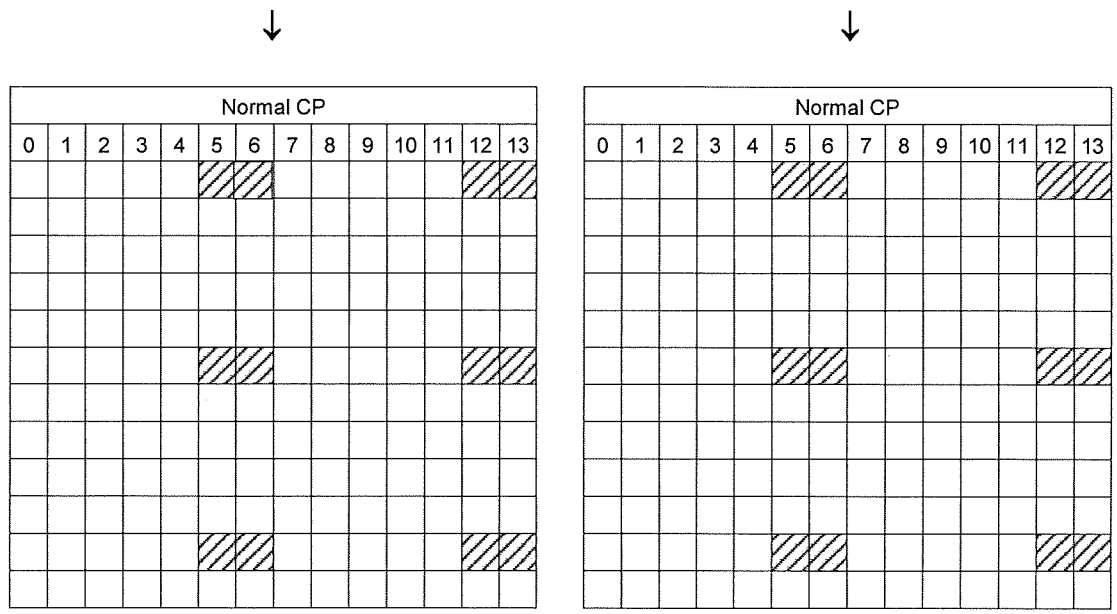
FIG. 16 to FIG. 20 are schematic diagrams illustrating identical or correlated reference signals.

FIG. 16 shows a resource block pair composed of 12 subcarriers in one subframe in LTE.

1. An Example of Identical Reference Signals: Identical Symbol Sequences Occupy Identical Time-Frequency Resources As shown in FIG. 17, data stream 1 and data stream 2 multiplex one resource block pair, reference signals of the two data streams in the resource block pair correspond to two identical sequences (shaded parts), and the two identical symbol sequences occupy identical resource units (RE) in identical orders.

Figure 18:
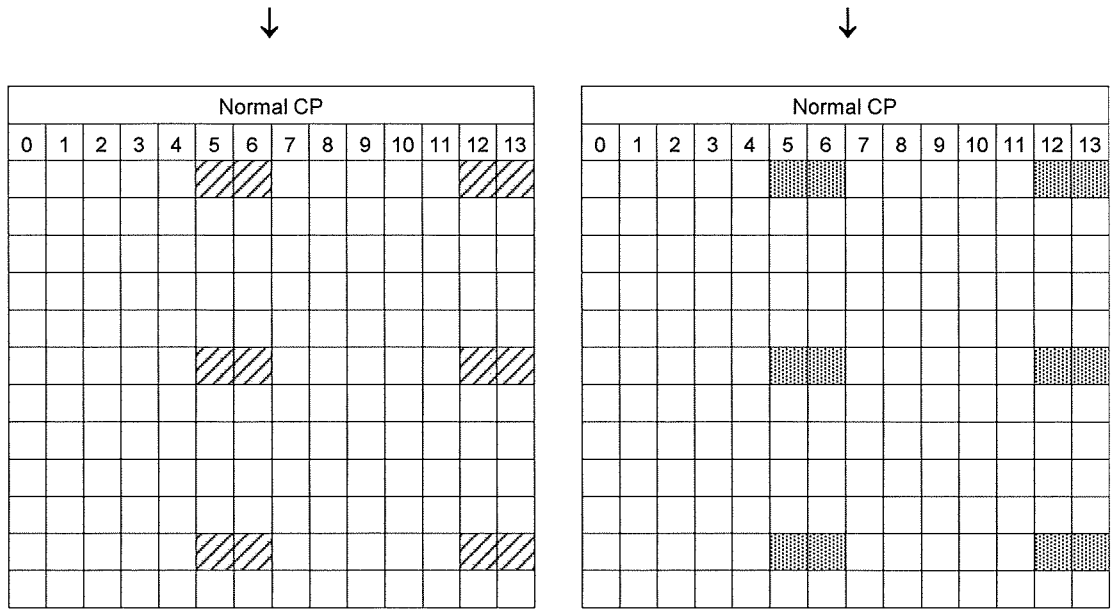

2. Example 1 of Correlated Reference Signals: Correlated Symbol Sequences Occupy Identical Time-Frequency Resources As shown in FIG. 18, data stream 1 and data stream 2 multiplex one resource block pair, reference signals of the two data streams in the resource block pair correspond to two different but correlated sequences (denoted as oblique shaded parts and dotted shaded parts), and the two symbol sequences occupy identical REs in identical orders.

Figure 19:
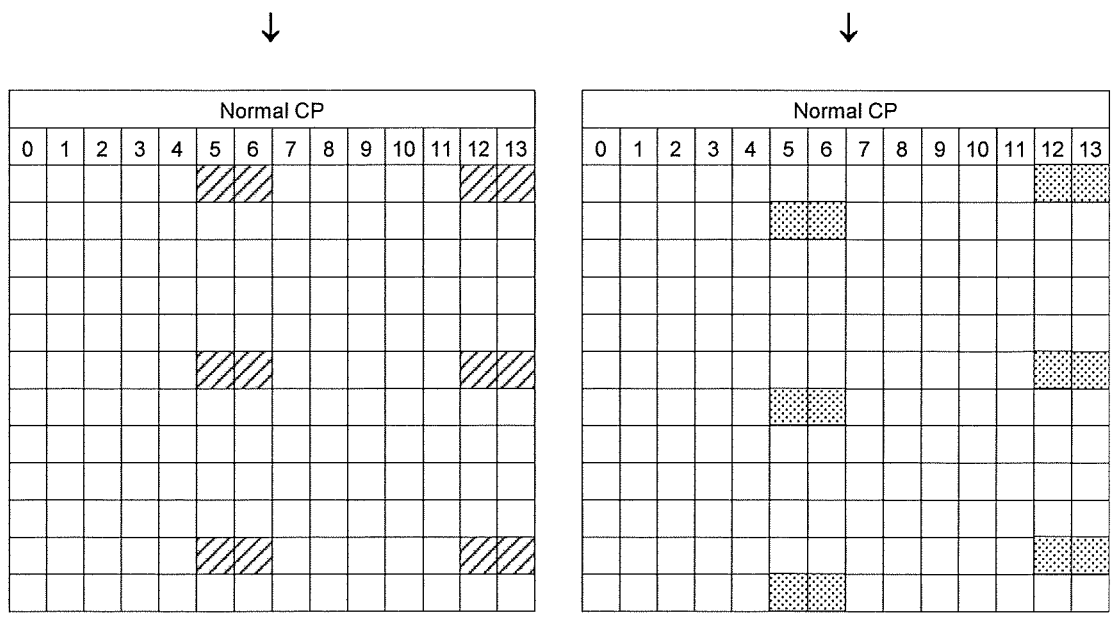

3. Example 2 of Correlated Reference Signals: Correlated Symbol Sequences Occupy Time-Frequency Resources which Partially Overlap with Each Other As shown in FIG. 19, data stream 1 and data streams 2 multiplex one resource block pair, reference signals of the two data streams in the resource block pair correspond two different but correlated sequences (denoted as oblique shaded parts and dotted shaded parts) composed of 12 symbols, a time-frequency resource occupied by the reference signal corresponding to the data stream 1 is as shown in the left-hand chart, and a time-frequency resource occupied by the reference signal corresponding to the data stream 2 is as shown in the right-hand chart. It can be seen that the time-frequency resource occupied by the reference signal corresponding to the data stream 1 partially overlaps with the time-frequency resource occupied by the reference signal corresponding to the data stream 2.

Figure 20:
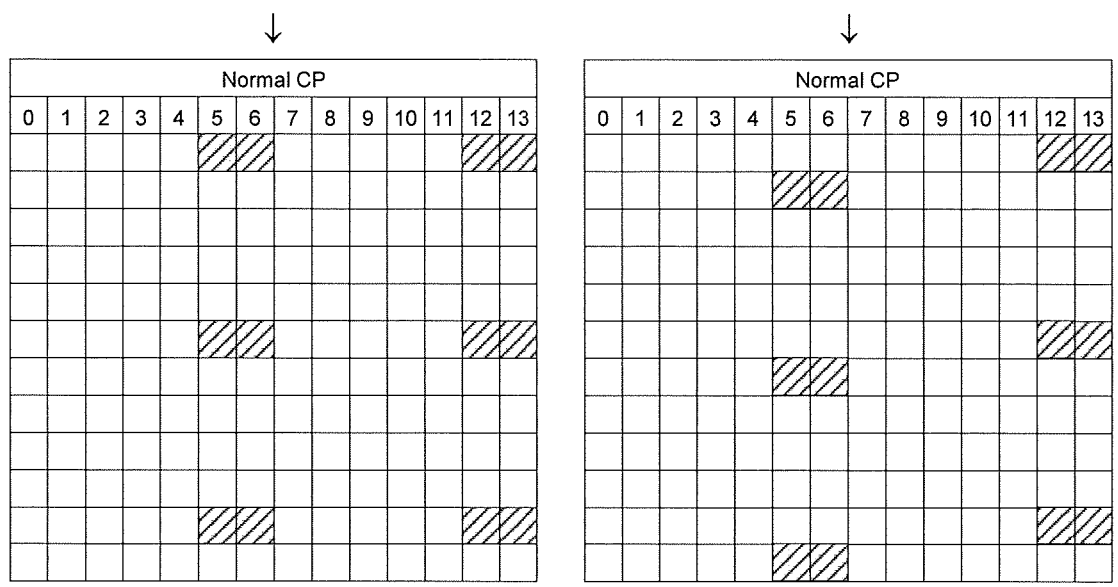

4. Example 3 of Correlated Reference Signals: Identical Symbol Sequences Occupy Time-Frequency Resources which are Partially Identical with Each Other As shown in FIG. 20, data stream 1 and data streams 2 multiplex one resource block pair, reference signals of the two data streams in the resource block pair correspond two identical sequences (shaded parts) composed of 12 symbols, a time-frequency resource occupied by the reference signal corresponding to the data stream 1 is as shown in the left-hand chart, and a time-frequency resource occupied by the reference signal corresponding to the data stream 2 is as shown in the right-hand chart. It can be seen that the time-frequency resource occupied by the reference signal corresponding to the data stream 1 is partially identical with the time-frequency resource occupied by the reference signal corresponding to the data stream 2.

Regarding how the correlated sequences are generated, according to conventional technology, a reference signal sequence is spread using an orthogonal code, to generate two code-division orthogonal reference signals. According to the technology of the present disclosure, a non-orthogonal code such as a pseudo-random code may be used to spread the same reference signal sequence to generate two correlated reference signals.

According to the existing technology, in a case that the time-frequency resource is limited, the number of orthogonal reference signals obtained by spreading using the orthogonal code is limited by the number of REs. However, with the technology according to the present disclosure, spreading is made using the non-orthogonal code, thereby greatly increasing the number of data streams supported by the time-frequency resources while ensuring quality of channel estimation using precoding.

For example, in a case that the reference signal sequence is spread using an orthogonal cover codes having the length of 4 according to the conventional technology, the orthogonal cover codes are [+1, +1, +1, +1], [+1, −1, +1, −1], [+1, +1, −1, −1] and [+1, −1, −1, +1], respectively, so four sets of orthogonal reference signals can be supported with the same RE resource, to be used for 4 data streams. With the technology according to the present disclosure, four cover codes such as [+1, −1, −1, −1], [−1, 1, 1, 1], [−1, +1, −1, +1] and [−1, −1, −1, +1] may be added in addition to the four orthogonal cover codes, it can be seen that the eight cover codes are correlated with each other rather than orthogonal to each other. Using the eight cover codes, eight correlated reference signals can be supported in the same RE resources, to be used for eight data streams. Correlation between the reference signals received by a UE can be further reduced by precoding, to reduce an effect on channel estimation.

It should be understood that details in the above example are only illustrative rather than restrictive.

Herein, modulation symbols in a same transmission layer belong to a same data stream, for example.

Two or more data streams may be used for two or more user equipments, respectively. Specifically, in a case that one user equipment has only one antenna, one user equipment corresponds to one data stream. According to the embodiment, in this case, identical or correlated reference signals may be used for two or more user equipments. In addition, in a case that a user equipment has more than one antenna, the user equipment may have data streams, the number of which corresponds to the number of antennas. In this case, according to the embodiment, the identical or correlated reference signals can be added into at least two data streams (of a same user equipment or different user equipments).

The precoding unit 115 is configured to precode the two or more data streams into which identical or correlated reference signals are added, to generate a downlink data signal. The downlink data signal is, for example, a time-domain orthogonal frequency division multiplexing (OFDM) signal for each antenna port.

For example, for a massive MIMO system, although identical or correlated reference signals are used for different data streams, the different data streams can be distinguished by progressive orthogonality in the massive MIMO system.

In addition, the different data streams may be distinguished by way of, for example, zero-forcing precoding, etc., in a case that the number of antennas is small. Correspondingly, according to an embodiment, the precoding unit 115 may be configured to precode the data streams using zero-forcing precoding algorithm.

Figure 14:
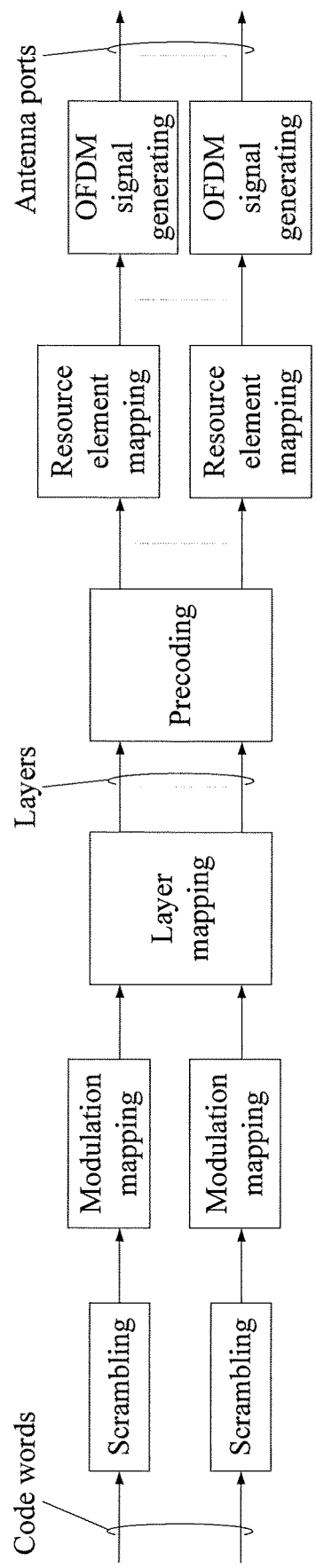
FIG. 14 is an illustration diagram outlining a physical channel processing.

Next, a difference between the embodiment and the existing solution is further illustrated with reference to FIG. 14. As shown in FIG. 14, code words are processed to be different layers of data streams through scrambling processing, modulation processing and layer mapping processing, and data signals corresponding to different antenna ports are generated through precoding processing, resource element mapping processing and OFDM signal generating processing.

According to the existing manner, a reference signal is added after the precoding processing shown in FIG. 14, and reference signals orthogonal to each other are added into the data streams, respectively.

In another aspect, according to the embodiment, a reference signal is added into the data stream before the precoding processing, and non-orthogonal reference signals are added for two or more data streams.

According to the solution of the present disclosure, for example, more users can be supported without increasing the length of the reference signals, thereby improving a utilization rate of the reference signals, which is particularly beneficial to for example a massive MIMO system.

In addition, according to an embodiment, the generating unit 111 may be configured to generate a reference signal for a cell based on an identifier of the cell. The reference signal is low correlated with or orthogonal to a reference signal used by a neighboring cell, thereby an interference between adjacent cells can be avoided.

Next, an exemplary manner of generating a reference signal based on an identifier of cell is illustrated. It should be understood that the invention is not limited to the details in the specific example.

In the existing LTE-A standards, a downlink reference signal is generated based on the equation below:

$$r_{l,n_s}(m) = \frac{1}{\sqrt{2}}[1 - 2c(2m)] + j\frac{1}{\sqrt{2}}[1 - 2c(2m+1)]$$

where m is the sequence number of reference signal, $n_s$ is the frame index, and l is the OFDM symbol index. A pseudo random sequence c(i) is a Gold sequence having a length of 31. In LTE-A, different downlink reference signals are distinguished by using different initialization states of pseudo random sequence.

For the reference signals shared by multiple data streams in the present disclosure, in order to ensure that the reference signals used by the different cells are orthogonal to each other approximately, different cells may select different initialization states. For example, an initialization state is selected based on cell identifier (ID), that is, different cells select different initialization states based on cell IDs thereof. In addition, in a case that a rule for generating the initialization state is known by the user, the user can know the reference signal used by the cell based on the cell ID without transmitting additional indication information.

Next, a configuration example of a wireless communication device for base station side according to another embodiment is illustrated with reference to FIG. 2.

Figure 2:
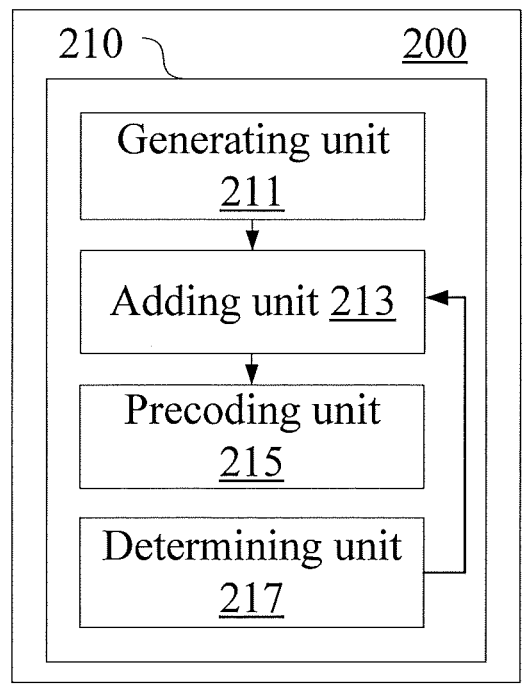
FIG. 2 is a block diagram showing a configuration example of a wireless communication device for base station side according to another embodiment.

As shown in FIG. 2, a wireless communication device 200 according to the embodiment includes a processor 210. For example, the processor 210 includes a generating unit 211, an adding unit 213, a precoding unit 215 and a determining unit 217. Configurations of the generating unit 211, the adding unit 213 and the precoding unit 215 are similar to those of the generating unit 111, the adding unit 113 and the precoding unit 115 described above with reference to FIG. 1.

The determining unit 217 is configured to determine whether to add identical or correlated reference signals into two or more data streams to be transmitted by the current cell based on one or more of a usage state of reference signal of a neighboring cell, a user channel, the number of data streams to be transmitted and usage states of the reference signals.

According to the embodiment, reference signals used in a data transmission (physical uplink shared channel (PUSCH)/physical uplink shared channel (PDSCH)) of the user may be allocated flexibly based on available reference signals and usage state of reference signals, such as a receiving matrix or a precoding state. In some cases, different data streams may correspond to orthogonal reference signals. In some other cases, different data streams may correspond to identical or correlated reference signals.

For example, in a case that the orthogonal reference signals are not enough due to the large number of downlink data streams, and interferences between the data streams can be eliminated by precoding and so on, non-orthogonal reference signals can be shared by several data streams, and interferences between reference signal sequences can be eliminated by receiving matrix/precoding and the like. In a case that the number of data streams is small and orthogonal reference signals are enough, orthogonal reference signals can be inserted into different downlink data streams. For another example, in a case that orthogonal reference signals for uplink are not enough due to the large number of uplink data streams (for example, multiple users need to perform uplink data transmissions simultaneously or one user has multiple layers of uplink data transmissions), and interferences between the data streams can be eliminated by a receiving matrix on base station side, non-orthogonal reference signals can be shared by several data streams, and interferences between the non-orthogonal reference signals can be eliminated by receiving matrix and the like. In a case that the number of data streams is small and the orthogonal reference signals are enough, orthogonal reference signals can be inserted into different uplink data streams.

More specifically, it can be determined to use the identical or correlated reference signals in the following case:

For the downlink transmission, the base station can eliminate, for example using zero-forcing precoding, a mutual interference between multiple downlink data streams in which non-orthogonal reference signals are used. For the uplink transmission, the base station can eliminate, for example using zero-forcing receiver (receiving matrix), a mutual interference between multiple uplink data streams in which non-orthogonal reference signals are used.

An exemplary manner is illustrated below by taking a downlink DMRS as a reference signal.

(i) A case where different data streams correspond to orthogonal reference signals:

For example, DMRS is generated based on antenna port and n_SCID. According to an existing manner, a mapping relation of DMRS with antenna port and n_SCID remains unchanged. According to the present disclosure, a new transmission mode can be defined to enable the base station to more flexibly allocate DMRS to an antenna port of the user equipment. The base station may transmit a bitmap of n_SCID and antenna ports to the user equipment, each bit corresponds one state of n_SCID/antenna port:

a) n_SCID=0 in a case that a bit of n_SCID is 0; and n_SCID=1 in a case that a bit of n_SCID is 1;

b) an antenna port is in a closed state in a case that a bit corresponding to the antenna port is 0; and an antenna port corresponds to a layer in a case that a bit corresponding to the antenna port is 1.

Currently, eight antenna ports plus one n_SCID are equal to nine bits, six bits are added as compared with three bits of a corresponding part in an existing DCI Format (downlink control information) 2C.

In this manner, different user equipments can use either a same antenna port or different antenna ports, and DMRSs corresponding to multiple layers of data streams of each user equipment are orthogonal to each other.

(ii) A case where different data streams correspond to identical or correlated reference signals:

The mapping relation of the DMRS mode with the antenna port is released, the base station needs to inform the user equipment of DMRS corresponding to each antenna port. In this way, a table of antenna ports occupies 3 bits as defined before, but a DMRS indication of 3 bits needs to be added corresponding to each antenna port, 24 bits are added in total. A technical effect is that the base station can allocate DMRS more flexible, and identical DMRSs may be used in multiple layers of data streams of each user equipment.

Next, the present technical solution is compared with standards in the conventional technology of the $3^{rd}$ generation partnership project (3GPP).

Related States of the Current Standards:

1. It is written in 3GPP TR 36.814 7.3 that, for enhanced multi-user (MU) MIMO transmission, a basic principle is that the switch for single-user (SU)-MIMO and MU-MIMO does not involve high-layer signaling, and a transmission mode (TM) is informed by radio resource control (RRC) signaling, so it can be determined that the current MU-MIMO is supported by TM9 and TM10.

2. It is written in 3GPP TR 36.814 7.4.1 that DMRSs for PDSCH are orthogonal in different layers of eNB. For MU-MIMO, data streams of different users should belong to different layers, so current DMRSs corresponding to different user data streams should be orthogonal. The orthogonality is represented in Table 5.3.3.1.5C-1 of 36.212, wherein four different single-stream users can obtain four groups of orthogonal DMRSs using single code words 0, 1, 2 and 3 by different antenna ports and nSCIDs, that is, MU-MIMO of four users is supported. Two dual-stream users can also obtains four groups of orthogonal DMRSs using dual code words 0 and 1, each stream of each user corresponds to one group.

3. A same nSCID has eight orthogonal DMRSs in table 6.10.3.2 of 36.211, which correspond to eight antenna ports.

When using the present solution, the standards in the conventional technology should be modified accordingly:

1. Table 6.10.3.2 of 36.211 currently includes eight orthogonal DMRS modes, which correspond to eight antenna ports. In the present disclosure, the DMRS modes can be numbered as DMRS 0 to DMRS 7 for example.

2. A new TM is added corresponding to a new DCI format. In addition to a table similar to table 5.3.3.1.5C-1 of 36.212, a field related to the DMRS mode needs to be defined, to give an allocated DRMS mode corresponding to each antenna of the user, a same DMRS mode may be used for different antenna ports, thereby the antenna ports can correspond to the DRMS modes flexibly. The DMRS mode may be indicated in the enhanced physical downlink control channel (ePDCCH) additionally.

It should be noted that although the determining unit 217 determines whether to add the identical or correlated reference signals into different data streams in the embodiment, the invention is not limited thereto. For example, the identical or correlated reference signals are directly used in multiple data streams in a whole cell or a user cluster (for example, users having better channel orthogonality can be grouped into one cluster) by default without determination process.

It should be further noted that in a case that the identical or correlated reference signals are used in multiple data streams of a user cluster, channels of the multiple users are orthogonal to each other, so zero-forcing precoding or zero-forcing receiver is not required.

Next, a configuration example of a wireless communication device on user equipment side according to another embodiment is illustrated with reference to FIG. 3.

Figure 3:
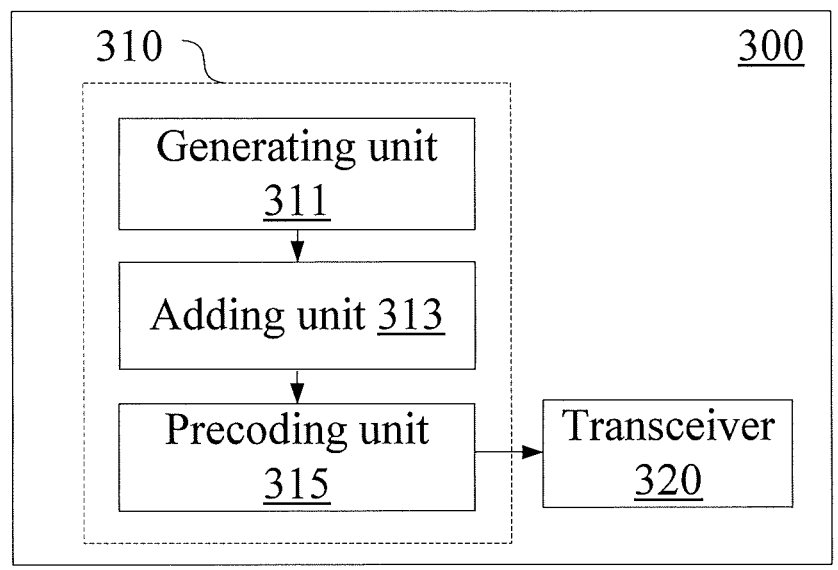
FIG. 3 is a block diagram showing a configuration example of a wireless communication device for base station side according to yet another embodiment.

As shown in FIG. 3, the wireless communication device 300 according to the embodiment includes at least one processor 310 and a transceiver 320. The processor 310 includes a generating unit 311, an adding unit 313 and a precoding unit 315. Configurations of the generating unit 311, the adding unit 313 and the precoding unit 315 are similar to those of the generating unit 111, the adding unit 113 and the precoding unit 115 described above with reference to FIG. 1.

The transceiver 320 is configured to transmit the downlink data signal generated by the precoding unit 315 to the user equipment. For example, the transceiver 320 may transmit the downlink data signal to the user equipment via a physical downlink shared channel (PDSCH).

In addition, according to an embodiment, the transceiver 320 may be configured to transmit information on the used reference signals to the user equipment, to inform the user equipment of the used reference signals. For example, the transceiver may indicate the information through orthogonal cover codes (OCC). In addition, the transceiver 320 may transmit the information via a physical downlink control channel (PDCCH). For example, the information may be contained in a scheduling assignment.

The information may indicate the used reference signals directly. Alternatively, the information may indicate a used antenna port in a case that there is a preset correspondence between antenna ports and reference signals.

Next, an exemplary process of transmitting downlink data in the wireless communication device according to the embodiment is described.

When transmitting downlink data, a base station transmits scheduling information to a user via a downlink control channel (PDCCH), to inform the user of the reference signal to be used for transmitting the downlink data. Alternatively, the base station implicitly informs the user equipment of the reference signal to be used for transmitting the downlink data by informing of a used antenna port (there is a preset correspondence between the antenna ports and the reference signals). The base station transmits the downlink data to the user via a downlink data channel (PDSCH).

For example, with reference to FIG. 14, the input data is a data stream subjected to operations such as scrambling, coding modulation. The data stream is mapped into a layer data stream through layer mapping, and a precoding operation is performed. In particular, identical or correlated reference signals are added into multiple data streams before the precoding operation. The data streams are mapped into different resource blocks through resource mapping, and are transmitted to antenna ports after precoding.

When the base station transmits the downlink data, a process flow of the user equipment is: obtaining explicit information on the reference signal by receiving the information transmitted via the PDCCH, or obtaining information on the used reference signal based on an antenna port by looking-up a table, and generating the reference signal using the information. The user estimates downlink effective channel state information using the reference signal through channel estimation, and detects, for example demodulates, the transmitted data streams using the channel estimation.

In a case that the reference signal is informed implicitly, the base station and the user equipment share a correspondence list between antenna ports and reference signals, for example. Different from an existing manner in LTE-A, multiple antenna ports may correspond to one reference signal in the embodiment of the present disclosure.

It should be understood that the invention is not limited to the details in the above examples.

In the above examples, the used reference signal may be determined based on the antenna port according to a predetermined correspondence. In addition, according to an embodiment, the reference signal may be determined by the wireless communication device on base station side.

Figure 4:
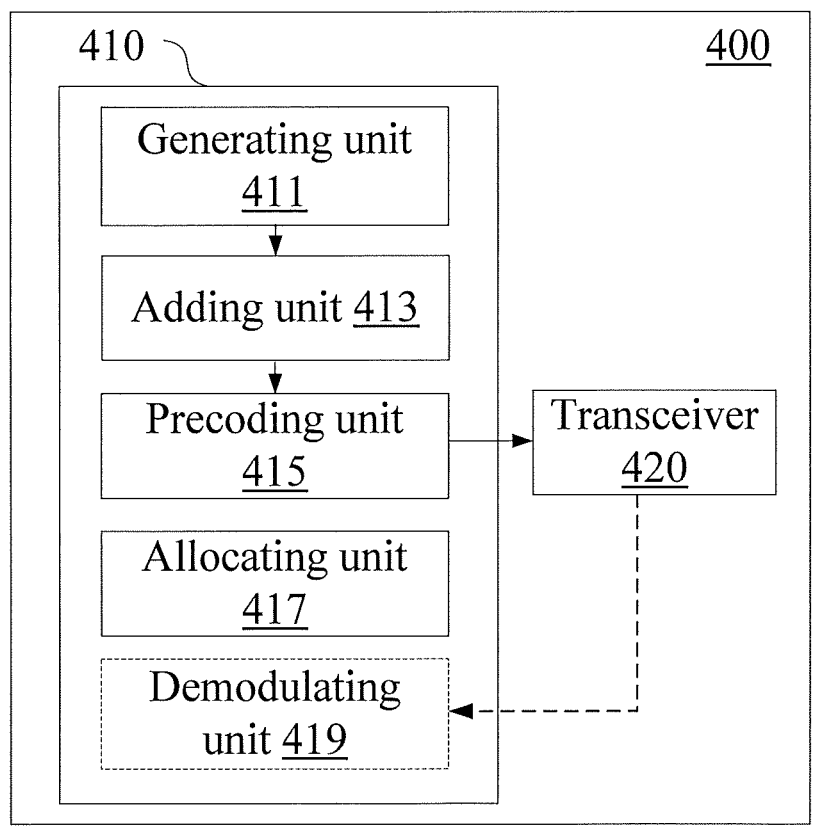
FIG. 4 is a block diagram showing a configuration example of a wireless communication device for base station side according to yet another embodiment.

As shown in FIG. 4, a wireless communication device 400 according to the embodiment includes at least one processor and a transceiver 420. The processor 410 includes a generating unit 411, an adding unit 413, a precoding unit 415 and an allocating unit 417. Configurations of the generating unit 411, the adding unit 413 and the precoding unit 415 are similar to those of the generating unit 111, the adding unit 113 and the precoding unit 115 described above with reference to FIG. 1.

The allocating unit 417 is configured to allocate a sequence and time-frequency resources of reference signals for an uplink data signal to a user equipment, so that two or more data streams of the uplink data signal correspond to identical or correlated reference signals.

In addition, according to an embodiment, the wireless communication device may allocate the reference signals for the uplink data signal based on a request of the user equipment. In the embodiment, the transceiver 420 is configured to receive the request of the user equipment for the reference signals for the uplink data signal. For example, the transceiver 420 may receive the request transmitted via a physical uplink control channel (PUCCH).

In addition, according to an embodiment, the transceiver 320 may be configured to receive the uplink data signal from the user equipment. Correspondingly, as shown by the dash-line box in FIG. 4, the processor 410 of the wireless communication device 400 may further include a demodulating unit 419 configured to demodulate the uplink data signal based on the reference signals allocated to the user equipment, and/or to estimate an uplink equivalent channel based on the reference signals allocated to the user equipment, wherein the uplink equivalent channel corresponds to a precoded uplink channel.

Next, an exemplary process of uplink data processing performed by the wireless communication device according to the embodiment with a user equipment is described.

When transmitting uplink data to the base station, the user equipment firstly transmits a scheduling request to the base station via PUCCH. While performing resource scheduling via PDCCH, the base station informs the user of reference signals used for transmitting the uplink data, or informs the user of the used reference signals implicitly by informing the user of an antenna port. The user equipment transmits the uplink data in a manner similar to the downlink data processing process described above with reference to FIG. 14. Reference signals added into at least a part of the multiple data streams are identical. Upon receiving the uplink data, the base station estimates uplink equivalent channel state information using the reference signals, and detects the uplink data using the channel estimation.

The wireless communication device according to the embodiment of the present disclosure is for example a base station in a time division duplex (TDD) wireless communication system.

Especially, the solution of the present disclosure is particularly suitable for a TDD massive MIMO system, and can reduce spectrum efficiency loss caused by downlink training while providing services to more users.

However, the solution of the present disclosure is also suitable for a frequency division duplex (FDD) system in consideration that the effective channel is also estimated in the FDD system.

Apparently, some processing and methods are also disclosed in describing the wireless communication device in the embodiments above. Hereinafter, an overview of a wireless communication method according to an embodiment of the present disclosure is given without repeating some details discussed above.

Figure 5:
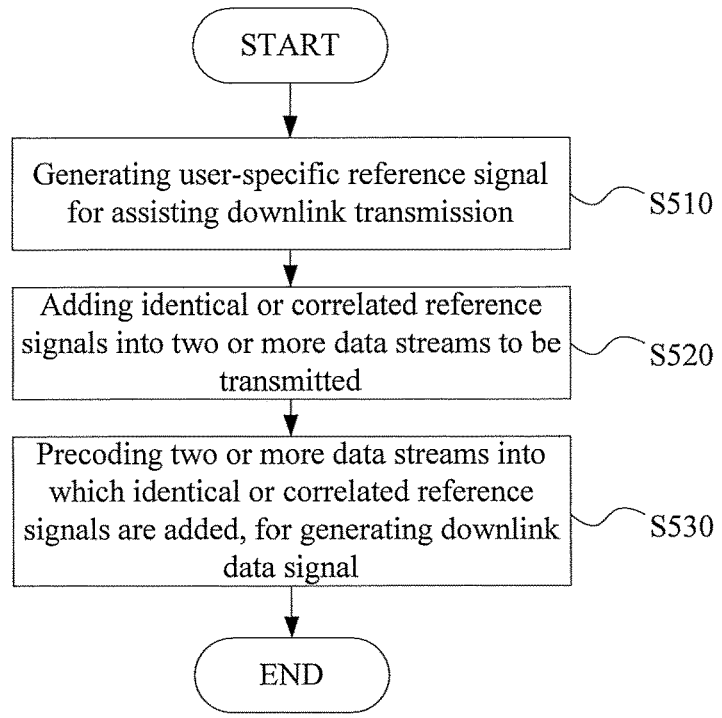
FIG. 5 is a flow diagram showing a process example of a wireless communication method performed by a base station according to an embodiment of the present disclosure.

As shown in FIG. 5, a wireless communication method performed by a base station according to an embodiment includes:

S510, generating a user-specific reference signal for assisting downlink transmission;

S520, adding identical or correlated reference signals into two or more data streams to be transmitted; and S530, precoding the two or more data streams into which the identical or correlated reference signals are added, for generating a downlink data signal.

In addition, the wireless communication method according to an embodiment further includes a step of transmitting the generated downlink data signal to a user equipment. The wireless communication method according to another embodiment further includes: demodulating an uplink data signal based on a reference signal allocated to the user equipment; and/or estimating an uplink equivalent channel based on the reference signal allocated to the user equipment, wherein the uplink equivalent channel corresponds to a precoded uplink channel.

In addition, the embodiments of the present disclosure further include a wireless communication device for user equipment side. As described above, the uplink data processing process performed on user equipment side may be similar to the downlink data processing process performed on base station side, so some details described above are omitted in the description below for the embodiments of the wireless communication device and the wireless communication method on user equipment side. It should be understood that the details may be also suitable for the uplink data processing performed on user equipment side.

Figure 6:
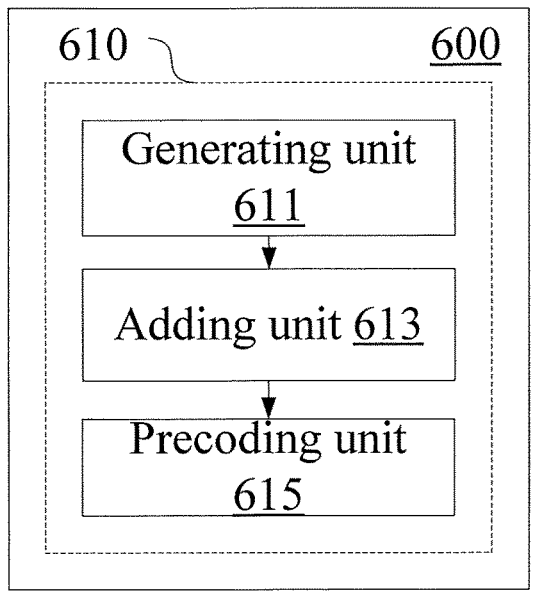
FIG. 6 is a block diagram showing a configuration example of a wireless communication device for user equipment side according to an embodiment of the present disclosure.

As shown in FIG. 6, a wireless communication device 600 for user equipment side according to an embodiment includes at least one processor 610. The processor 610 includes a generating unit 611, an adding unit 613 and a precoding unit 615.

The generating unit 611 is configured to generate a reference signal for uplink data demodulation.

The adding unit 613 is configured to add identical or correlated reference signals into two or more data streams to be transmitted.

As described above, the identical reference signals may be generated based on identical sequences and occupy identical time-frequency resources. The correlated reference signals may be generated based on correlated sequences and occupy time-frequency resources which at least partially overlap with each other. In addition, the correlated reference signals are also generated based on identical sequences and occupy time-frequency resources which partially overlap with each other.

For example, the generating unit 611 and the adding unit 613 can generate and add the reference signals based on reference signals (for example, informed by the base station side explicitly or implicitly) allocated on base station side (for example, in response to a request of user equipment side).

The precoding unit 615 is configured to precode the two or more data streams into which the identical or correlated reference signals are added, for generating an uplink data signal.

Figure 7:
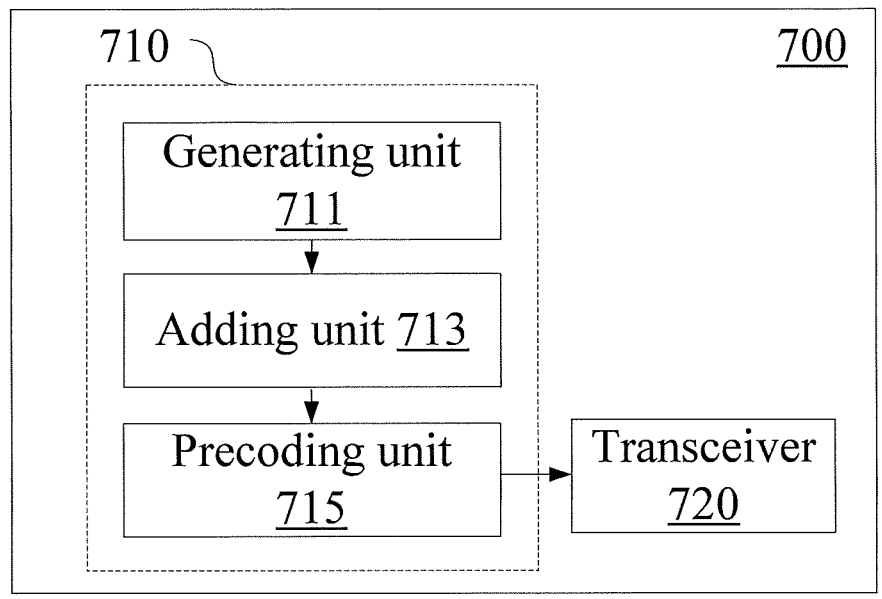
FIG. 7 is a block diagram showing a configuration example of a wireless communication device for user equipment side according to another embodiment.

As shown in FIG. 7, a wireless communication device 700 for user equipment side according to an embodiment includes at least one processor 710 and a transceiver 720. The processor 710 includes a generating unit 711, an adding unit 713 and a precoding unit 715, which are similar to the generating unit 611, the adding unit 613 and the precoding unit 615 illustrated above with reference to FIG. 6.

The transceiver 720 is configured to transmit the uplink data signal generated by the precoding unit 715 to the base station.

As described above, the user equipment may request the base station to allocate reference signals. Correspondingly, according to an embodiment, the transceiver 729 may transmit a request for information on the reference signals to the base station. For example, the transceiver 720 may transmit the request via PUCCH.

In addition, the wireless communication device for user equipment side according to an embodiment may receive and demodulate the downlink data signal from the base station according to the above embodiment.

Figure 8:
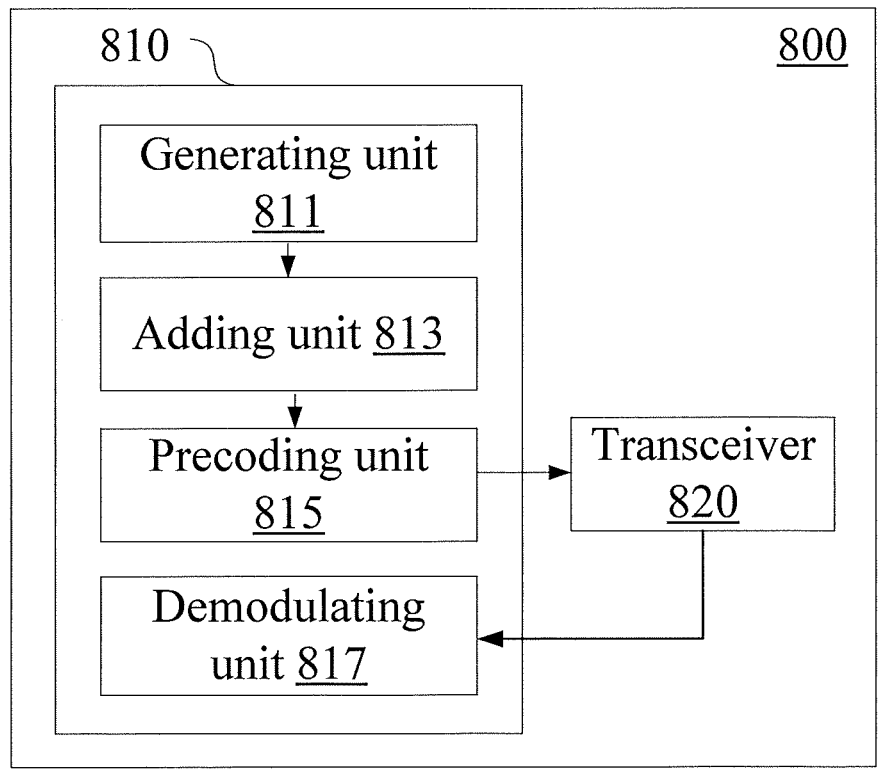
FIG. 8 is a block diagram showing a configuration example of a wireless communication device for user equipment side according to yet another embodiment.

As shown in FIG. 8, a wireless communication device 800 for user equipment side according to the embodiment includes at least one processor 810 and a transceiver 820. The processor 810 includes a generating unit 811, an adding unit 813, a precoding unit 815 and a demodulating unit 817. The generating unit 811, the adding unit 813 and the precoding unit 815 are similar to the generating unit 611, the adding unit 613 and the precoding unit 615 illustrated above with reference to FIG. 6.

The transceiver 820 is configured to receive a downlink data signal and information on reference signals used in the downlink data signal from a base station.

The demodulating unit 817 is configured to demodulate data streams from two or more antenna ports in the downlink data signal based on the identical or correlated reference signals, based on the information on the reference signals used in the downlink data signal.

In other words, according to the embodiment, the data streams from multiple antenna ports are demodulated based on the identical or correlated reference signals. More specifically, a downlink channel is estimated based on the identical or correlated reference signals, and multiple data streams from the base station are restored based on a result of the estimation.

Figure 9:
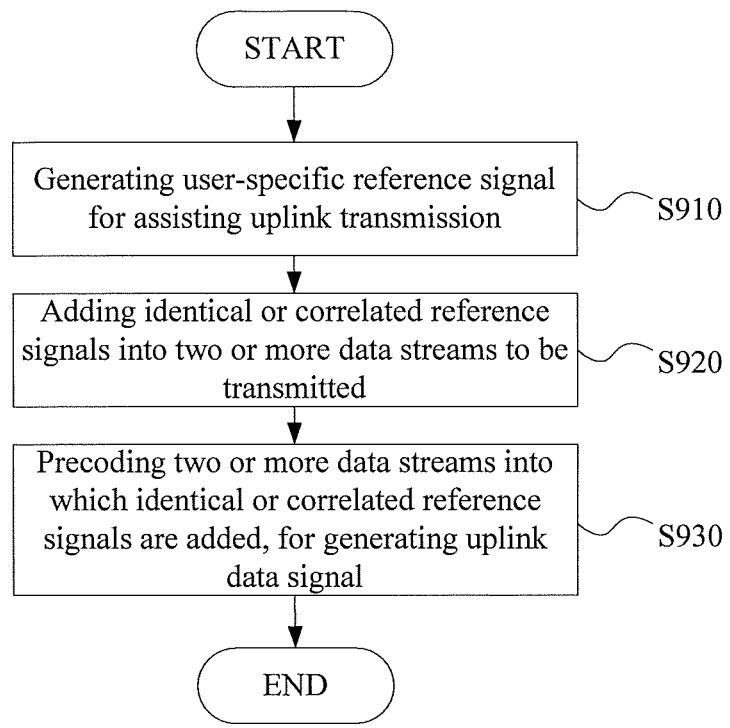
FIG. 9 is a flow diagram showing a process example of a wireless communication method performed by a user equipment according to an embodiment of the present disclosure.

FIG. 9 shows a process example of a wireless communication method performed by a user equipment according to an embodiment of the present disclosure.

The wireless communication method according to the embodiment includes the steps of:

S910, generating a user-specific reference signal for assisting uplink transmission;

S920, adding identical or correlated reference signals into two or more data streams to be transmitted; and S930, precoding the two or more data streams into which the identical or correlated reference signals are added, for generating an uplink data signal.

In addition, a wireless communication method according to an embodiment may further include a step of transmitting the generated uplink data signal to a base station. A wireless communication method according to another embodiment further includes a step of demodulating data streams from two or more antenna ports in a downlink data signal based on identical or correlated reference signals, based on information on reference signals used in the downlink data signal.

The wireless communication device and the wireless communication method for base station side and the wireless communication device and the wireless communication method for user equipment side are illustrated above. Next, embodiments of the present disclosure are illustrated from the perspective of a transmitting end and a receiving end.

Figure 10:
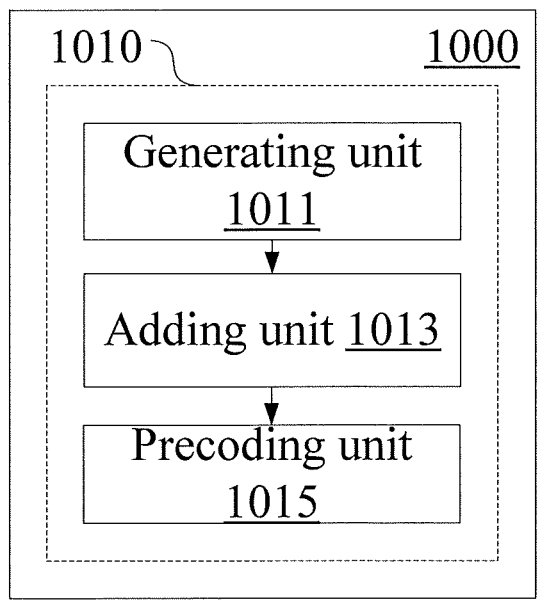
FIG. 10 is a block diagram showing a configuration example of a wireless communication device for a transmitting end according to an embodiment of the present disclosure.

FIG. 10 shows a configuration example of a wireless communication device for a transmitting end according to an embodiment of the present disclosure. A wireless communication device for the transmitting end may be a base station or a user equipment. In a case that the base station serves as a transmitting end, a downlink data signal is to be transmitted. In a case that the user equipment serves as the transmitting end, an uplink data signal is to be transmitted.

As shown in FIG. 10, the wireless communication device 1000 includes at least one processor 1010. The processor 1010 includes a generating unit 1011, an adding unit 1013 and a precoding unit 1015.

The generating unit 1011 is configured to generate a reference signal for data demodulation. In a case that a base station serves as the transmitting end, the generating unit 1011 may have a similar configuration with the generating unit 111 illustrated above with reference to FIG. 1. In a case that a user equipment serves as the transmitting end, the generating unit 1011 may have a similar configuration with the generating unit 611 illustrated above with reference to FIG. 6.

The adding unit 1013 is configured to add identical or correlated reference signals into two or more data streams to be transmitted. In a case that a base station serves as the transmitting end, the adding unit 1013 may have a similar configuration with the adding unit 113 illustrated above with reference to FIG. 1. In a case that a user equipment serves as the transmitting end, the adding unit 1013 may have a similar configuration with the adding unit 613 illustrated above with reference to FIG. 6.

The precoding unit 1015 is configured to precode the two or more data streams into which the identical or correlated reference signals are added, for generating a data signal to be transmitted. In a case that a base station serves as the transmitting end, the precoding unit 1015 may have a similar configuration with the precoding unit 115 illustrated above with reference to FIG. 1. In a case that a user equipment serves as the transmitting end, the precoding unit 1015 may have a similar configuration with the precoding unit 615 illustrated above with reference to FIG. 6.

In addition, although not shown in FIG. 10, the wireless communication device for the transmitting end according to an embodiment may further include a transceiver. In a case that a base station serves as the transmitting end, the transceiver is configured to transmit the downlink data signal to a user equipment. In a case that a user equipment serves as the transmitting end, the transceiver is configured to transmit the uplink data signal to a base station.

Figure 11:
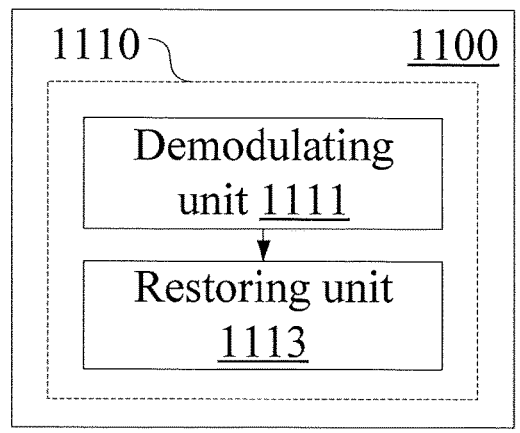
FIG. 11 is a block diagram showing a configuration example of a wireless communication device for a receiving end according to another embodiment of the present disclosure.

FIG. 11 shows a configuration example of a wireless communication device for a receiving end according to an embodiment of the present disclosure. The wireless communication device for the receiving end may be a base station or a user equipment. In a case that a base station serves as the receiving end, an uplink data signal is received. In a case that a user equipment serves as the receiving end, a downlink data signal is received.

As shown in FIG. 11, the wireless communication device 1100 includes at least one processor 1110. The processor 1110 includes a demodulating unit 1111 and a restoring unit 1113.

The demodulating unit 1111 is configured to demodulate a data signal received from multiple antenna ports based on identical or correlated reference signals.

The restoring unit 1113 is configured to restore two or more data streams contained in the data signal based on a result of the demodulation.

Identical or correlated reference signals are added into the two or more data streams.

In a case that a base station serves as the receiving end, the demodulating unit 1111 may have a similar configuration with the demodulating unit 419 illustrated above with reference to FIG. 4. In a case that a user equipment serves as the receiving end, the demodulating unit 1111 may has a similar configuration with the demodulating unit 817 illustrated above with reference to FIG. 8.

Specifically, the received uplink or downlink effective channel state information is estimated based on the reference signals, and the uplink data or the downlink data is restored using the channel estimation.

In addition, although not shown in the drawing, a wireless communication device for a receiving end according to an embodiment may further includes a transceiver. In a case that a base station serves as the receiving end, the transceiver is configured to receive an uplink data signal from a user equipment. In a case that a user equipment serves as the receiving end, the transceiver is configured to receive a downlink data signal from a base station.

As an example, all steps of the method described above and all component modules and/or units of the devices described above may be implemented with software, firmware, hardware or a combination thereof. In a case that the steps or component modules are implemented with software or firmware, programs constituting the software for implementing the method described above is installed into a computer (for example, a general-purposed computer 1200 as shown in FIG. 12) having a dedicated hardware structure from a storage medium or network, the computer can execute various functions while being installed with various programs.

Figure 12:
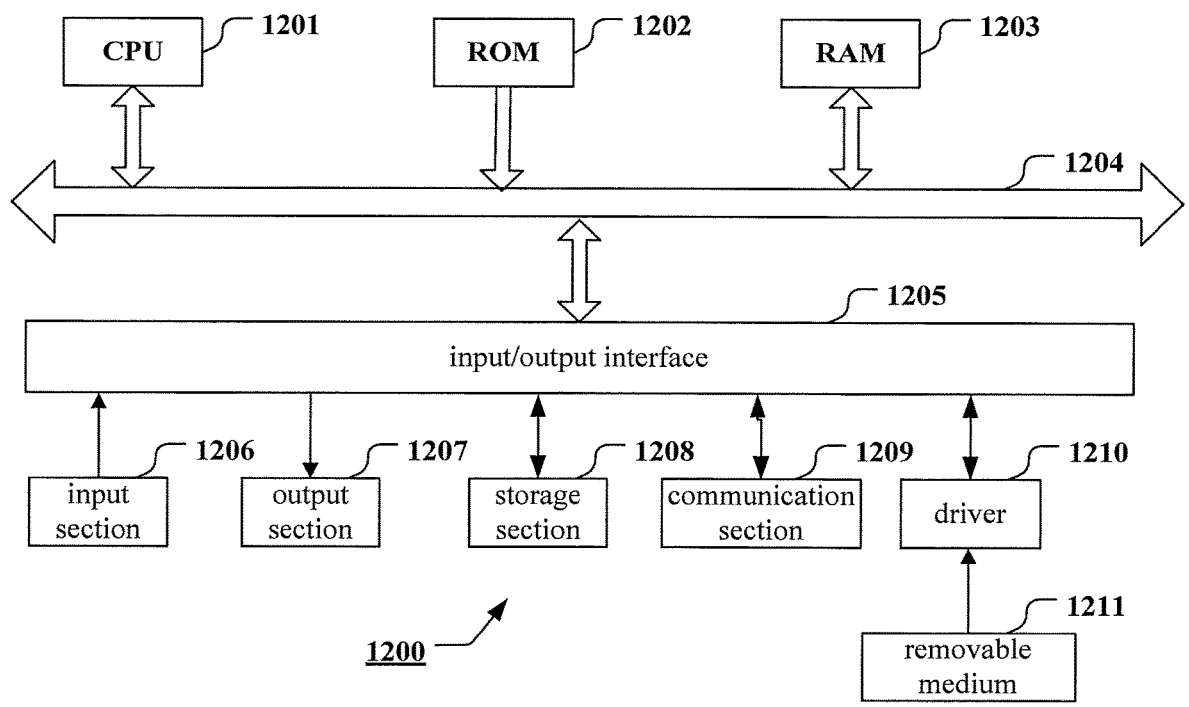
FIG. 12 is a block diagram showing an exemplary structure of a computer for implementing a method and a device according to the present disclosure.

In FIG. 12, a central processing unit (CPU) 1201 executes various processing according to a program stored in a read-only memory (ROM) 1202 or a program loaded to a random access memory (RAM) 1203 from a storage section 1208. The data needed for the various processing of the CPU 1201 may be stored in the RAM 1203 as needed. The CPU 1201, the ROM 1202 and the RAM 1203 are linked with each other via a bus 1204. An input/output interface 1205 is also linked to the bus 1204.

The following components are linked to the input/output interface 1205: an input section 1206 (including keyboard, mouse and the like), an output section 1207 (including a display such as a cathode ray tube (CRT), a liquid crystal display (LCD), a speaker and the like), a storage section 1208 (including hard disc and the like), and a communication section 1209 (including a network interface card such as a LAN card, a modem and the like). The communication section 1209 performs communication processing via a network such as the Internet. A driver 1210 may also be linked to the input/output interface 1205 according to needs. A removable medium 1211 such as a magnetic disc, an optical disc, a magnetic optical disc and a semiconductor memory may be installed in the driver 1210 according to needs, so that the computer program read therefrom is installed in the storage section 1208 according to needs.

In the case where the foregoing series of processing is achieved with software, programs forming the software are installed from a network such as the Internet or a storage medium such as the removable medium 1211.

It should be appreciated by those skilled in the art that the storage medium is not limited to the removable medium 1211 shown in FIG. 12, which has program stored therein and is distributed separately from the device so as to provide the programs to users. The removable medium 1211 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)) and a semiconductor memory. Alternatively, the storage medium may be ROM 1202 and a hard disc included in the storage section 1208, in which programs are stored, and can be distributed to users along with the device in which they are incorporated.

The embodiments of the present disclosure further relates to a program product on which machine-readable instruction codes are stored. The machine-readable instruction codes can enable a machine to execute the methods according to the embodiments of the present disclosure described above when being read and executed by the machine.

Accordingly, a storage medium for carrying the program product on which the machine-readable instruction codes are stored is also included in the present disclosure. The storage medium includes but not limited to a floppy disk, an optical disk, a magneto-optical disk, a memory card, a memory stick and the like.

The embodiments of the present disclosure further relates to the following electronic device. In a case that the electronic device is applied into a base station side, the electronic device can be implemented as any types of evolved node B (eNB), such as a macro eNB and a small eNB. The small eNB may be an eNB of a cell having a smaller coverage range than a macro cell, such as a pico-cell eNB, a micro-cell eNB and a family (femto-cell) eNB. Alternatively, the electronic device may also be implemented as any types of base stations, such as a NodeB and a base transceiver station (BTS). The electronic device may include an entity (also referred to a base station device) configured to control wireless communication; and one or more remote radio head (RRH) arranged in a position different from the entity. In addition, any types of terminals described below can operate as a base station by temporarily or semi-persistently performing a function of the base station. In addition, the electronic device on base station side may also be a processing chip rather than a whole eNB.

In a case that the electronic device is applied to use equipment side, the electronic device can be implemented as a mobile terminal (such as a smart phone, a tablet personal computer (PC), a notebook PC, a portable game terminal, a portable/dongle mobile router and a digital camera) or a vehicle terminal (such as an automobile navigation device). In addition, the electronic device may be a wireless communication module (such as an integrated circuit module including one or more chips) installed on each of the terminals described above.

[Application Example of a Terminal Device]

Figure 13:
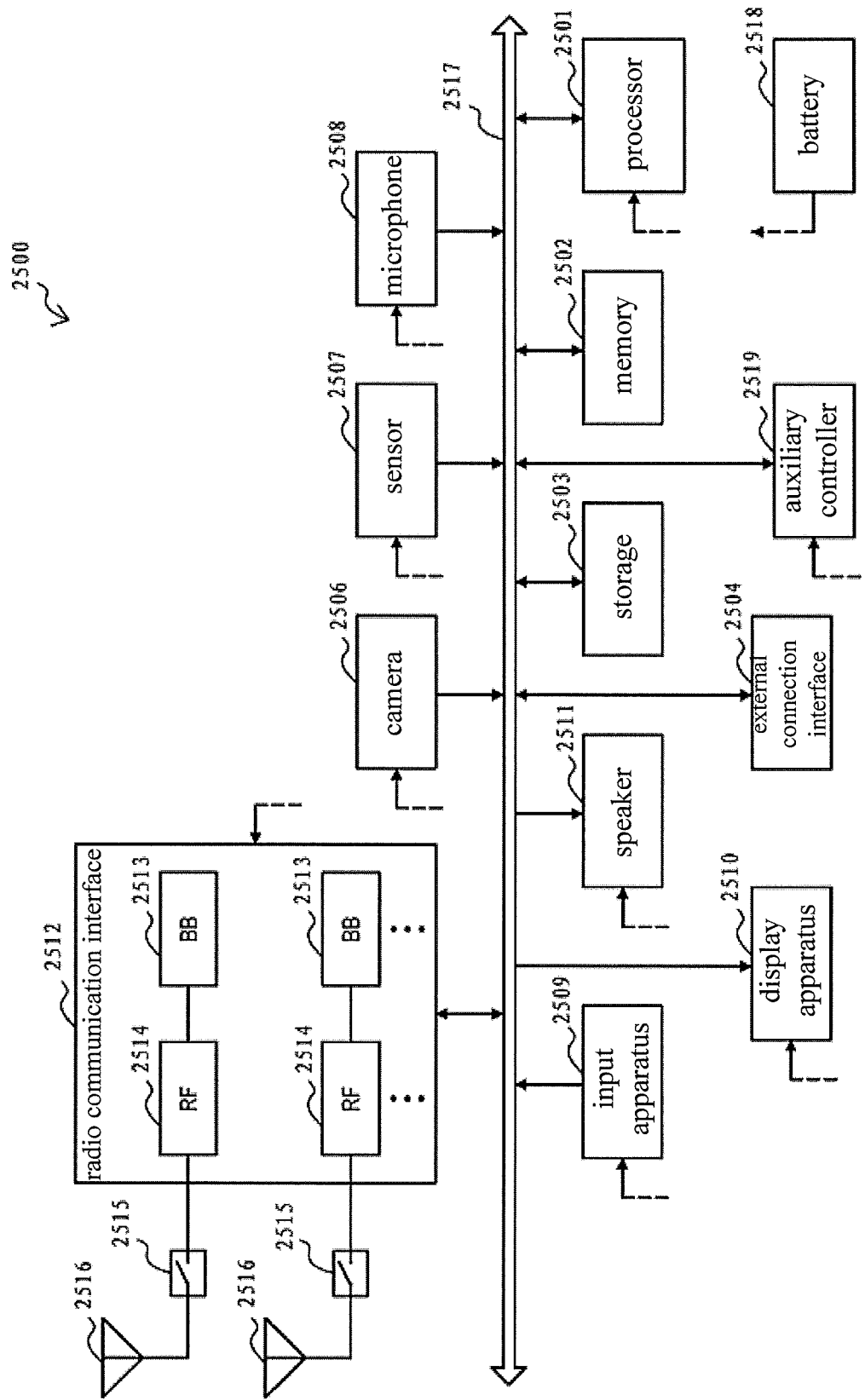
FIG. 13 is a block diagram showing a schematic configuration example of a smart phone to which the technology according to the present disclosure may be applied.

FIG. 13 is a block diagram showing a schematic configuration example of a smart phone 2500 in which the technology of the present disclosure may be applied. The smartphone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518 and an auxiliary controller 2519.

The processor 2501 may be for example a CPU or a system on chip (SoC), and controls functions of an application layer and other layers of the smart phone 2500. The memory 2502 includes a RAM and a ROM, and stores a program executed by the processor 2501 and data. The storage 2503 may include a storage medium such as a semiconductor memory and a hard disk. The external connection interface 2504 is an interface for connecting the external device (such as a memory card and a universal serial bus (USB) device) to the smart phone 2500.

The camera 2506 includes an image sensor (such as a charge-coupled device (CCD) and a complementary metal oxide semiconductor (CMOS)), and generates a captured image. The sensor 2507 may include a group of sensors such as a measurement sensor, a gyroscope sensor, a geomagnetic sensor and an acceleration sensor. The microphone 2508 switches the sound inputted to the smart phone 2500 into an audio signal. The input apparatus 2509 includes a touch sensor configured to detect touch on a screen of the display apparatus 2510, a keypad, a keyboard, a button or a switch, and receive an operation and information inputted from the user. The display apparatus 2510 includes a screen (such as a liquid crystal display (LCD) and an organic light-emitting diode (OLED)), and displays an output image of the smart phone 2500. The speaker 2511 converts the audio signal outputted from the smart phone 2500 into sound.

The radio communication interface 2512 supports any cellular communication scheme (such as LTE and LTE-advanced), and execute wireless communication. The radio communication interface 2512 may include for example a BB processor 2513 and a RF circuit 2514. The BB processor 2513 may execute for example encoding/decoding, modulation/demodulation and multiplexing/demultiplexing, and execute various types of signal processing for wireless communication. The RF circuit 2514 may include for example a frequency mixer, a filter or an amplifier, and transmit and receive a radio signal via the antenna 2516. The radio communication interface 2512 may be a chip module on which the BB processor 2513 and the RF circuit 2514 are integrated. As shown in FIG. 13, the radio communication interface 2512 may include multiple BB processors 2513 and multiple RF circuits 2514. Although the radio communication interface 2512 shown in FIG. 13 includes multiple BB processors and multiple RF circuits 2514, the radio communication interface 2512 may include a single BB processor 2513 and a single RF circuit 2514.

In addition to the cellular communication scheme, the radio communication interface 2512 may support other types of wireless communication scheme, such as a short-distance wireless communication scheme, a near field communication scheme and a wireless local area network (LAN) scheme. In this case, the radio communication interface 2512 may include a BB processor 2513 and a RF circuit 2514 for each wireless communication scheme.

Each of the antenna switches 2515 switches a connection destination of the antenna 2516 between multiple circuits (for example, a circuit for different wireless communication schemes) included in the radio communication interface 2512.

Each of the antennas 2516 includes one or more antenna elements (for example, multiple antenna elements included in the MIMO antenna), and is used for transmitting and receiving a radio signal via the radio communication interface 2512. As shown in FIG. 13, the smart phone 2500 may include multiple antennas 2516. Although the smart phone 2500 shown in FIG. 13 includes multiple antennas 2516, the smart phone 2500 may include a single antenna 2516.

In addition, the smart phone 2500 may include an antenna 2516 for each wireless communication scheme. In this case, the antenna switch 2515 may be omitted in the configuration of the smart phone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512 and the auxiliary controller 2519 with each other. The battery 2518 supplies power to each block in the smart phone 2500 shown in FIG. 13 via a feed line, which is shown as a dash line in FIG. 13. The auxiliary controller 2519 operates a minimum necessary function of the smart phone 2500 in a sleep mode.

In the smart phone 2500 shown in FIG. 13, the transceiver 720 and the transceiver 820 shown in FIG. 7 and FIG. 8 can be implemented by the radio communication interface 2512. At least part of the functions of units described with reference to FIG. 6 to FIG. 8 may be realized by the processor 2501 and the auxiliary controller 2519. For example, the auxiliary controller 2519 may execute a part of functions of the processor 2501, to reduce power consumption of the battery 2518. In addition, the processor 2501 or the auxiliary controller 2519 may execute at least part of functions of units described with reference to FIG. 6 to FIG. 8 by executing programs stored in the memory 2502 or the storage 2503.

[Application Example of a Base Station]

Figure 15:
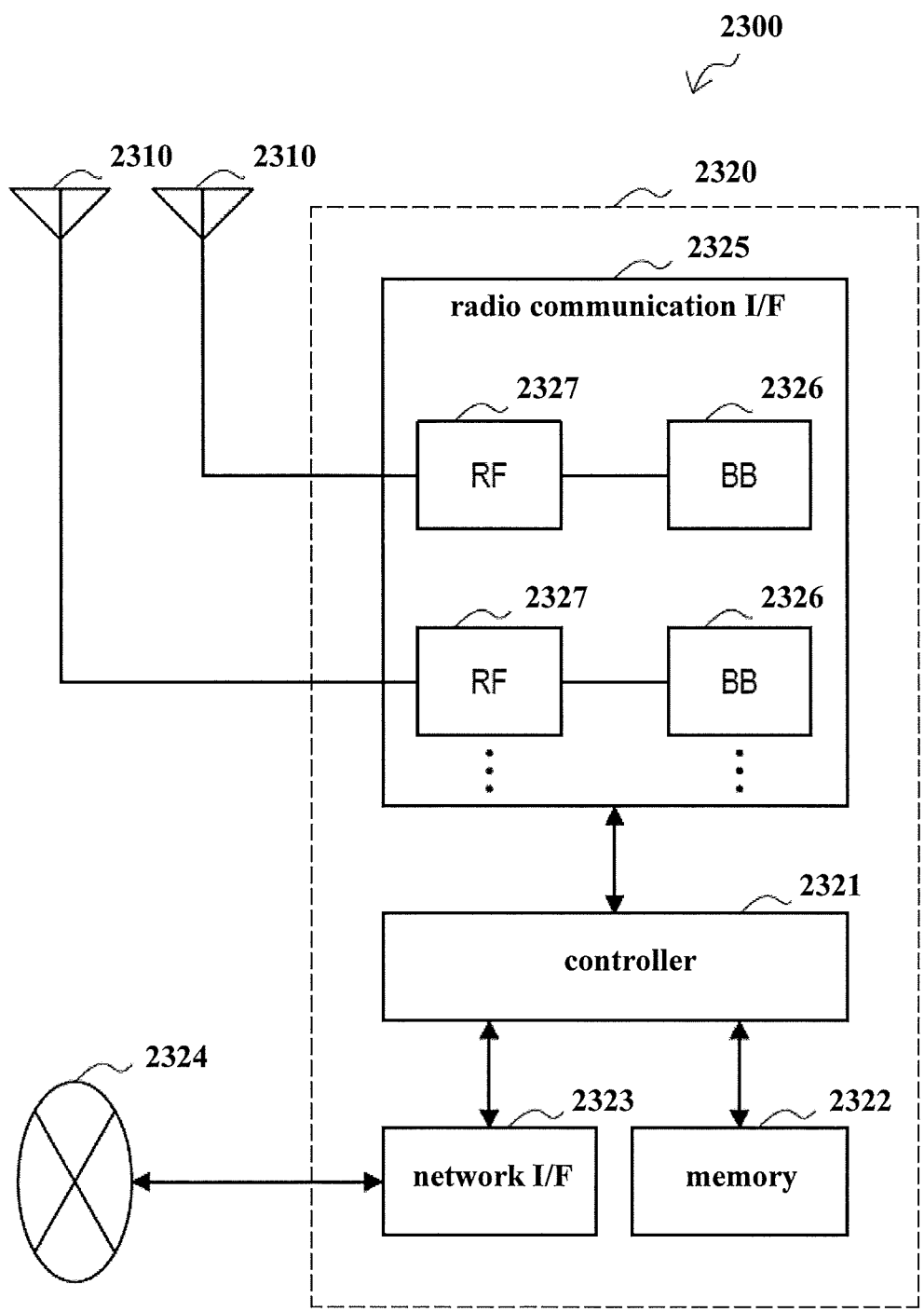
FIG. 15 is a block diagram showing a schematic configuration example of an evolved base station (eNB) to which the technology according to the present disclosure may be applied.

FIG. 15 is a block diagram showing a schematic configuration example of an eNB applying the technology according to the present disclosure. eNB 2300 includes one or more antennas 2310 and a base station device 2320. The base station device 2320 and each antenna 2310 may be connected with each other via radio frequency (RF) cable.

Each of the antennas 2310 includes one or more antenna elements (such as the multiple antenna elements included in the multiple-input multiple-output (MIMO) antenna), and is used for transmitting and receiving the wireless signal by the base station device 2320. As show in FIG. 15, the eNB 2300 may include multiple antennas 2310. For example, the multiple antennas 2310 may be compatible with the multiple frequency bands used by the eNB 2300. Although FIG. 10 shows an example of the eNB 2300 including multiple antennas 2310, the eNB 2300 may also include a single antenna 2310.

The base station device 2320 includes a controller 2321, a memory 2322, a network interface 2323 and a radio communication interface 2325.

For example, the controller 2321 may be a CPU or DSP, and performs various functions of higher layers of the base station device 2320. For example, the controller 2321 generates a data packet based on the data in the signal processed by the radio communication interface 2325, and transfers the generated packet via the network interface 2323. The controller 2321 may bundle data from multiple baseband processors to generate bundled data, and transfers the generated bundled data. The controller 2321 may have logical function to perform the control such as radio resource control, radio bearer control, mobility management, admission control and scheduling. The control may be performed in conjunction with the neighboring eNB or a core network node. The memory 2322 includes RAM and ROM, and stores the program to be performed by the controller 2321 and various types of control data (such as a terminal list, transmission power data and scheduling data).

The network interface 2323 is a communication interface for connecting the base station device 2320 to the core network 2324. The controller 2321 may communication with the core network node or another eNB via the network interface 2323. In this case, the eNB 2300 and the core network node or the other eNB may be connected with each other via a logic interface (such as S1 interface and X2 interface). The network interface 2323 may also be a wired communication interface or a radio communication interface for wireless backhaul routing. If the network interface 2323 is a radio communication interface, the network interface 2323 may use a higher frequency band for wireless communication as compared with that used by the radio communication interface 2325.

The radio communication interface 2325 supports any cellular communication scheme (such as the long term evolution (LTE) and the LTE-Advanced), and provides a wireless connection to a terminal located in the cell of the eNB 2300 via the antenna 2310. The radio communication interface 2325 may generally include for example a baseband (BB) processor 2326 and a RF circuit 2327. The BB processor 2326 may perform for example coding/decoding, modulation/demodulation and multiplexing/de-multiplexing, and performs various types of signal processes of the layer (for example L1, media access control (MAC), radio link control (RLC) and packet data convergence protocol (PDCP)). Instead of the controller 2321, the BB processor 2326 may have some or all of the above logical functions. The BB processor 2326 may be a memory storing the communication control program, or a module including a processor and related circuit configured to perform the program. The updating program may change the function of the BB processor 2326. The module may be a card or blade inserted into the slot of the base station device 2320.

Alternatively, the module may be a chip mounted on the card or the blade. The RF circuit 2327 may include for example a mixer, a filter and an amplifier, and transmit and receive the wireless signal via the antenna 2310.

As shown in FIG. 15, the radio communication interface 2325 may include multiple BB processors 2326. For example, the multiple BB processors 2326 may be compatible with the multiple frequency bands used by the eNB 2300. As shown in FIG. 15, the radio communication interface 2325 may include multiple RF circuits 2327. For example, the multiple RF circuits 2327 may be compatible with multiple antenna elements. Although an example in which the radio communication interface 2325 includes multiple BB processors 2326 and multiple RF circuits 2327 is shown in FIG. 15, the radio communication interface 2325 may also include a single BB processor 2326 and a single RF circuit 2327.

In the eNB 2300 shown in FIG. 15, the transceiver 320 and the transceiver 420 described with reference to FIG. 3 and FIG. 4 may be implemented with the radio communication interface 2325. At least a part of the functions of the units described with reference to FIG. 1 to FIG. 4 may also be performed by the controller 2321. For example, the controller 2321 may perform at least a part of the functions of the units described with reference to FIG. 1 to FIG. 4 by performing program stored in the memory 2322.

In the above description of embodiments of the present disclosure, a feature described and/or illustrated in an embodiment may be applied to one or more other embodiments in a same or similar manner, or may be combined with a feature in other embodiments, or may replace a feature in other embodiments.

It should be emphasized that, the term "include/contain", as used in the present disclosure, means existence of a feature, an element, a step or a component, but does not exclude existence or addition of one or more other features, elements, steps or components.

In the above examples and embodiments, numeric reference characters are used for representing various steps and/or units. Those skilled in the art should understand that the reference characters are only used for facilitating description and illustration rather than representing an order or other limits.

Furthermore, the methods in the present disclosure are not limited to be performed in the time order as described, but may be performed in other time orders or in parallel or independently. Therefore, the performing order of the method described in the present disclosure is not a limit for the technical scope of the present disclosure.

Although the present disclosure is disclosure above by describing the above embodiment of the present disclosure, it should be understood that the above examples and embodiment are exemplary rather than restrictive. Those skilled in the art may make various modifications, improvements and equivalents within the spirit and scope of the appended claims. The modifications, improvements and equivalents should also be contained in the protection scope of the present disclosure.

The invention claimed is:

1. A wireless communication device for base station side, comprising:
   at least one processor configured to:
   generate a user-specific reference signal for assisting a downlink transmission, the user-specific reference signal being added to two or more data streams before any precoding processing;
   add identical or correlated reference signals into the two or more data streams to be transmitted, wherein the length of the user-specific reference signal and the identical or correlated reference signals are not increased;
   precode the two or more data streams into which the identical or correlated reference signals are added, for generating a downlink data signal;
   receive an uplink data signal from a user equipment;
   demodulate the uplink data signal based on a reference signal allocated to the user equipment;
   estimate an uplink equivalent channel based on the reference signal allocated to the user equipment, wherein the uplink equivalent channel corresponds to a precoded uplink channel; and
   detect the uplink data using the channel estimation.

2. The wireless communication device according to claim 1, wherein the identical reference signals are generated based on identical sequences and occupy identical time-frequency resources.

3. The wireless communication device according to claim 1, wherein the correlated reference signals are generated based on correlated sequences and occupy time-frequency resources which at least partially overlap with each other; or
   wherein the correlated reference signals are generated based on identical sequences and occupy time-frequency resources which partially overlap with each other.

4. The wireless communication device according to claim 1, wherein the at least one processor is further configured to:
   determine whether to add the identical or correlated reference signals into the two or more data streams to be transmitted by a current cell based on one or more of a usage state of a reference signal of a neighboring cell, a user channel, the number of data streams to be transmitted and usage states of the identical or correlated reference signals.

5. The wireless communication device according to claim 1, wherein the two or more data streams are used for two or more user equipments, respectively.

6. The wireless communication device according to claim 1, wherein the two or more data streams are used for a same user equipment.

7. The wireless communication device according to claim 1, wherein the at least one processor is configured to precode the two or more data streams using zero-forcing precoding algorithm.

8. The wireless communication device according to claim 1, further comprising a transceiver configured to transmit information on a used reference signal to a user equipment wherein
   the information indicates the used reference signal; or
   the information indicates a used antenna port in a case that there is a predetermined correspondence between antenna ports and the reference signals.

9. The wireless communication device according to claim 8, wherein the transceiver is configured to transmit the information via a physical downlink control channel.

10. The wireless communication device according to claim 1, wherein the at least one processor is configured to generate a reference signal for a cell based on an identifier of the cell, wherein the reference signal is low correlated with or orthogonal to a reference signal used by a neighboring cell.

11. The wireless communication device according to claim 1, further comprising a transceiver configured to receive, via a physical uplink control channel, a request of a user equipment for a reference signal for an uplink data signal.

12. A wireless communication device for user equipment side, comprising: at least one processor configured to:
   generate a user-specific reference signal for assisting an uplink transmission, the user-specific reference signal being added to two or more data streams before any precoding processing;
   add identical or correlated reference signals into the two or more data streams to be transmitted, wherein the length of the identical or correlated reference signals are not increased;
   precode the two or more data streams into which the identical or correlated reference signals are added, for generating an uplink data signal;
   transmit the generated uplink data signal to a base station;
   transmit a request for generating information on the identical or correlated reference signals;
   receive downlink data from the base station;
   estimate downlink effective channel state information based on a reference signal used in the downlink data signal;
   demodulate downlink data streams from two or more antenna ports in a downlink data signal based on the identical or correlated reference signals; and
   restore the two or more downlink data streams based on the demodulation.

13. The wireless communication device according to claim 12, wherein the identical reference signals are generated based on identical sequences and occupy identical time-frequency resources.

14. The wireless communication device according to claim 12, wherein the correlated reference signals are generated based on correlated sequences and occupy time-frequency resources which at least partially overlap with each other.

15. The wireless communication device according to claim 12, wherein the correlated reference signals are generated based on identical sequences and occupy time-frequency resources which partially overlap with each other.

16. The wireless communication device according to claim 12, wherein the wireless communication device is the user equipment, and further comprises a transceiver configured to transmit the uplink data signal to the base station.

17. The wireless communication device according to claim 16, wherein the transceiver is configured to transmit, to the base station, the request for generating information on the identical or correlated reference signals.

18. The wireless communication device according to claim 17, wherein the transceiver is configured to transmit the request via a physical uplink control channel.

* * * * *